US012804629B2

(12) United States Patent
Schnieders

(10) Patent No.: US 12,804,629 B2
(45) Date of Patent: Nov. 17, 2026

(54) RELIABLE LOW LATENCY AND LOW JITTER COMMUNICATION CONNECTION

(71) Applicant: Deutsche Telekom AG, Bonn (DE)

(72) Inventor: Dominik Schnieders, Aachen (DE)

(73) Assignee: Deutsche Telekom AG, Bonn (DE)

( * ) Notice: Subject to any disclaimer, the term of this patent is extended or adjusted under 35 U.S.C. 154(b) by 272 days.

(21) Appl. No.: 18/633,562

(22) Filed: Apr. 12, 2024

(65) Prior Publication Data

US 2024/0349263 A1 Oct. 17, 2024

(30) Foreign Application Priority Data

Apr. 14, 2023 (EP) ..................................... 23167906

(51) Int. Cl.
*H04W 72/0453* (2023.01)
*H04W 72/563* (2023.01)

(52) U.S. Cl.
CPC ..... *H04W 72/0453* (2013.01); *H04W 72/563* (2023.01)

(58) Field of Classification Search
None
See application file for complete search history.

(56) References Cited

U.S. PATENT DOCUMENTS

| | | | | |
|---|---|---|---|---|
| 2009/0067335 | A1 | 3/2009 | Pelletier et al. | |
| 2011/0170408 | A1 | 7/2011 | Furbeck et al. | |
| 2018/0034736 | A1* | 2/2018 | Anchan | H04L 47/2433 |
| 2019/0069313 | A1* | 2/2019 | Kim | H04W 72/21 |
| 2020/0059436 | A1* | 2/2020 | Chen | H04L 67/62 |
| 2020/0252862 | A1* | 8/2020 | Kim | H04W 8/08 |
| 2025/0150872 | A1* | 5/2025 | Maamari | H04W 24/10 |
| 2025/0211536 | A1* | 6/2025 | Gupta | H04L 47/30 |

* cited by examiner

*Primary Examiner* — Phirin Sam
(74) *Attorney, Agent, or Firm* — LEYDIG, VOIT & MAYER, LTD.

(57) ABSTRACT

A method for operating a communication network includes: transmitting, by a sender of a distributed real-time application, a data stream at a data rate to a receiver of the distributed real-time application via a connection provided by the communication network; allocating, by a scheduler of the communication network, spectral resources of the communication network for the data stream according to a priority assigned to the data stream by the communication network; marking, by the scheduler, packets of the data stream based on a difference between the allocated spectral resources and spectral resources allowed for the data stream; and checking, by the receiver of the distributed real-time application, the data stream for marked packets and causing the sender to gradually reduce the data rate of the data stream based on determining that the data stream comprises marked packets.

16 Claims, 1 Drawing Sheet

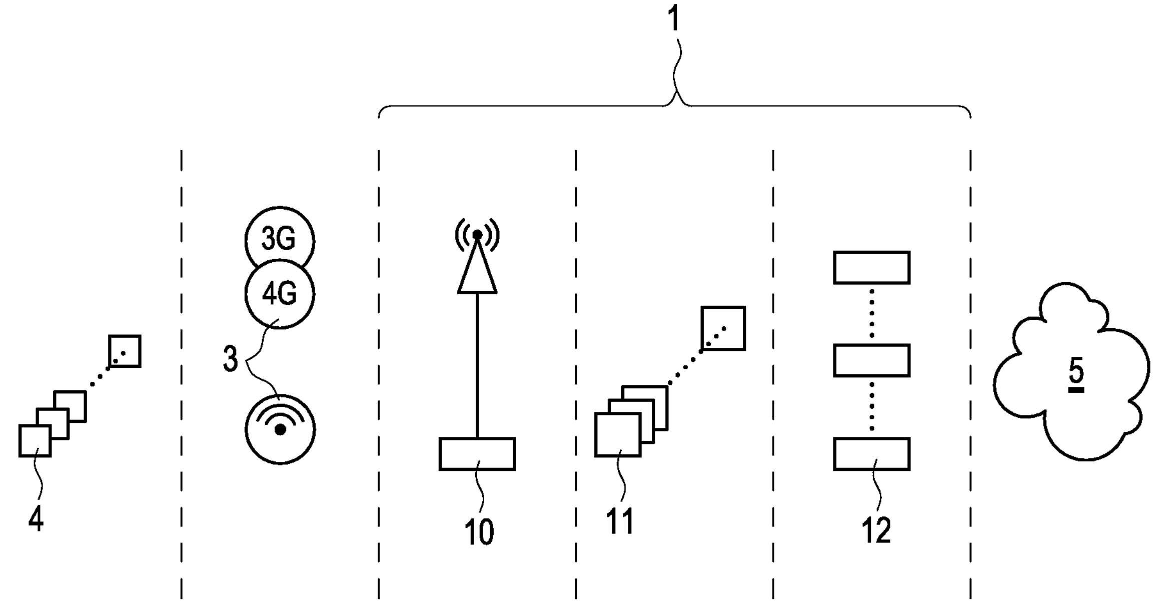
1
3G
4G
3
4
10
11
12
5
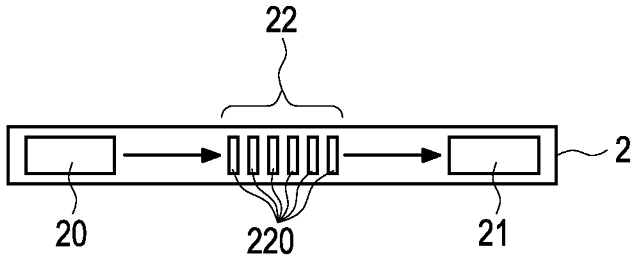
22
2
20
220
21

RELIABLE LOW LATENCY AND LOW JITTER COMMUNICATION CONNECTION

CROSS-REFERENCE TO PRIOR APPLICATION

This application claims benefit to European Patent Application No. EP 23 167 906.9, filed on Apr. 14, 2023, which is hereby incorporated by reference herein.

FIELD

The invention relates to a method for operating a communication network, wherein a sender of a distributed real-time application transmits a data stream at a data rate to a receiver of the distributed real-time application via a connection provided by the communication network. The invention further relates to a distributed real-time application, a scheduler for a communication network, and a computer program product.

BACKGROUND

A distributed real-time application comprises an application frontend and an application backend. The application frontend and the application backend are configured for transmitting a data stream, i.e. application data, via a communication network. Both the application frontend and the application backend may be the sender or the receiver. The data stream is usually periodically transmitted as a plurality of data packets, packets in short. Distributed real-time applications may be also referred to as near-real-time-applications, time-critical applications, or latency-critical applications.

Each distributed real-time application suffers from and may even fail due to high latency and/or high jitter, i.e., variability of the latency, of the communication connection, connection in short. The latency of the communication connection is essentially caused by a queue time, i.e., a time interval required for Internet Protocol (IP) packets to pass through a queue provided by a scheduler of the communication network providing the connection.

Congestion of the queue increases the latency of the connection. Variation of the congestion, accordingly, results in jitter with respect to the latency.

In 5G cellular networks, Low Loss, Low Latency and Scalable Throughput (L4S), as specified in Request For Comments (RFC) 9330, 9331 and 9332, allows for providing a distributed real-time application with a low latency connection. L4S relies on the scheduler providing congestion feedback to the distributed real-time application and the distributed real-time application adapting a data rate of the transmitted data stream dependent on the provided congestion feedback.

However, the latency of the connection can still have latency peaks resulting in jitter when using L4S. Particularly, a long Round Trip Time (RTT) of the connection results in a dead time preventing the distributed real-time application from immediately adapting the data rate of the transmitted data stream.

SUMMARY

In an exemplary embodiment, the present invention provides a method for operating a communication network. The method includes: transmitting, by a sender of a distributed real-time application, a data stream at a data rate to a receiver of the distributed real-time application via a connection provided by the communication network; allocating, by a scheduler of the communication network, spectral resources of the communication network for the data stream according to a priority assigned to the data stream by the communication network; marking, by the scheduler, packets of the data stream based on a difference between the allocated spectral resources and spectral resources allowed for the data stream; and checking, by the receiver of the distributed real-time application, the data stream for marked packets and causing the sender to gradually reduce the data rate of the data stream based on determining that the data stream comprises marked packets.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 schematically shows an entity diagram of a communication network being operated in a method according to an embodiment of the invention.

DETAILED DESCRIPTION

Exemplary embodiments of the invention provide a method for operating a communication network which reliably provides a distributed real-time application with a low latency and low jitter connection. Further exemplary embodiments of the invention provide a distributed real-time application, a scheduler for a communication network, and a computer program product.

One aspect of the invention is a method for operating a communication network, wherein a sender of the distributed real-time application transmits a data stream at a data rate to a receiver of the distributed real-time application via a connection provided by the communication network. Each of an application frontend of the distributed real-time application and an application backend of the distributed real-time application may be the sender or the receiver. A stationary server may execute the application backend. A terminal device may execute the application frontend. Both the stationary server and the terminal device are connected to the communication network. The distributed real-time application benefits from low latency and low jitter of the connection for proper operation.

According to the invention, a scheduler of the communication network allocates spectral resources of the communication network for the data stream according to a high rank priority assigned to the data stream by the communication network and marks packets of the data stream dependent on a difference of the allocated spectral resources from spectral resources allowed for the data stream, and the receiver of the distributed real-time application checks the data stream for marked packets and causes the sender to gradually reduce the data rate of the data stream as long as the data stream comprises marked packets. The high rank priority ensures low latency and low jitter of the connection as the scheduler primarily extracts the packets of the data stream from a queue and, thus, prevents the queue from congesting. The rank of the priority is chosen high enough for guaranteeing the primary extraction of the packets of the data stream. The gradual reduction allows the distributed real-time application for a smooth variation of the data rate.

On the other hand, the scheduler keeps track of the spectral resources allocated to the data stream and prevents the connection from having an unduly predominant allocation of spectral resources. By marking the packets the scheduler provides the distributed real-time application with feedback concerning the spectral resources currently used as compared to an appropriate, i.e. allowed, usage of spectral resources. In response to the feedback the distributed real-time application adapts the data rate in order to reduce the usage of spectral resources to an appropriate amount.

It is noted that the queue is generally short when carrying out exemplary embodiments of a method according to the present invention. Thus, it may not be necessary to combine an L4S method with exemplary embodiments of a method according to the present invention.

The scheduler preferably marks a percentage of the packets, the percentage being a value of a function of the difference. Values of the function are in a range from 0%, i.e. no packet is marked, to 100%, each packet is marked. The function defines a first domain of an appropriate usage of spectral resources, the function being evaluated to 0% in the first domain, and a second domain of an inappropriate usage of spectral resources, the function being evaluated to 100% in the second domain.

The function may define a third domain, i.e. transitional domain, in between the first domain and the second domain and connecting the first domain and the second domain, the function being evaluated to values above 0% and below 100% in the third domain.

A step function defining a threshold value, a linear function or a non-linear function may be evaluated as the function. The step function has no third domain and immediately jumps from 0% to 100% at the threshold value. The linear function and the non-linear function each have third domain defined by a lower threshold and an upper threshold. The value of the linear function smoothly increases from 0% to 100% at a constant slope in the third domain. The value of the linear function also smoothly increases from 0% to 100% in the third region, but at a varying slope. The varying slope allows for controlling an adaptation of the distributed real-time application in a greater detail.

Advantageously, marking a packet comprises setting an Explicit Congestion Notification (ECN) bit of an IP header of the packet. The ECN bit in this case is used differently from how the ECN bit is used for L4S, as the ECN bit in this case does not indicate congestion of the queue but rather an inappropriate usage of spectral resources. Rededicating the ECN bit is possible when L4S is not used, as mentioned above.

In an embodiment, gradually reducing comprises smoothly reducing during a grace time, the grace time being in a range from some 100 milliseconds to few seconds (e.g., 2 or 3 or 4 seconds). The grace time is a time interval an adaptation of the data rate is expected. The indicated range does not require the data rate to be adapted suddenly.

The rank of the priority may be lowered and the allocated spectral resources are reduced correspondingly, or a Low Latency, Low Loss and Scalable throughput (L4S) method may be applied to the data stream when the allocated spectral resources exceed the allowed spectral resources after the grace time. After the grace time, the scheduler takes a measure for reducing the spectral resources allocated to the connection. The distributed real-time application is so to speak punished for not adapting the data rate fast enough. The punishment prevents the distributed real-time application from misusing spectral resources of the communication network. The punishment comprises either assigning a lower rank to the data stream resulting in fewer spectral resources allocated to the connection or completely revoking the priority assigned to the data stream and switching to the L4S method instead.

The spectral resources may be allocated dependent on the data rate, a signal quality of the connection, and/or a load of the communication network. Of course, the allocation of the spectral resources does not depend on the rank of priority only. Rather, the allocation depends on the data rate of the data stream, the signal quality of the connection, or the load of the communication network, e.g., caused by data streams simultaneously transmitted by further distributed applications. Each of an increasing data rate of the data stream, a worsening signal quality of the connection (e.g., a decreasing Signal and Interference to Noise Ratio (SINR)), and an increasing spectral demand of concurrent distributed applications requires more spectral resources to be allocated to the connection in order to meet the high rank of priority.

In an embodiment, the priority is assigned as an absolute priority, a delay-based priority, or a relative priority. The scheduler may dynamically change the delay-based priority and the relative priority, respectively, in order to ensure a primary extraction of the packets of the data stream from the queue.

Preferably, a terminal device and an edge cloud server execute the sender and the receiver, respectively, or vice versa, and/or a Radio Access Network (RAN), as the communication network provides a wireless connection as the connection. The terminal device may comprise a mobile device, e.g., a User Equipment (UE), such as a smartphone or a tablet. The edge cloud server is located close to a Base Transceiver Station (BTS) of the RAN allowing for a short RTT. The BTS may execute the scheduler. The spectral resources may be allocated as Physical Resource Blocks (PRBs).

A 5G cellular network may provide the wireless connection and the data stream may be transmitted as a 5G flow. The 5G flow is a User Plane Function (UPF) of the 5G cellular network for transmitting data from a sender to a receiver.

The connection is advantageously provided as a Non-Guaranteed Bit Rate (Non-GBR) bearer of the communication network. In other words, the connection does not intrinsically guarantee a minimum bit rate for the transmitted data stream. The data rate of the data stream is met by assigning the high rank of priority.

In an embodiment, the allowed spectral resources are determined according to a fair distribution of spectral resources among a plurality of distributed applications or equal to spectral resources predetermined for the distributed real-time application. The scheduler may apply different criteria for determining the spectral resources to be allocated to the connection. A first criterion is based on the fair distribution of spectral resources. The fair distribution avoids the spectral resources being allocated to the connection at the expense of concurrent distributed applications. A second criterion relies on an absolute determination in advance, e.g., resulting from a subscription.

Another exemplary embodiment of the invention provides a distributed real-time application, comprising a sender and a receiver. The sender and the receiver comprise a computing device configured for execution a frontend of the distributed real-time application and a backend of the distributed real-time application, respectively.

According to the invention, the distributed real-time application is configured for carrying out a method according to an embodiment of the invention cooperating with a scheduler of a communication network. The distributed real-time application particularly is able to check a transmitted data stream for marked packets of the data stream and to adapt a data rate of the data stream corresponding to marked packets found in the data stream.

A third exemplary embodiment of the invention is a scheduler for a communication network. The scheduler comprises a computing device configured for executing the scheduler.

According to the invention, the scheduler is configured for carrying out a method according to an embodiment of the invention cooperating with a distributed real-time application. The scheduler particularly is able to compare spectral resources allocated to a connection with allowed spectral resources allowed for the connection and mark packets of a data stream transmitted via the connection dependent on a difference of the allocated spectral resources from the allowed spectral resources.

A fourth exemplary embodiment of the invention is a computer program product, comprising a non-transitory digital storage medium storing a program code. The digital storage medium may comprise a Compact Disk (CD), a Digital Versatile Disk (DVD), a Random Access Memory (RAM), a chip, a Universal Serial Bus (USB) stick, a Hard Disk (HD), a cloud storage, or the like.

According to the invention, the program code causes a computing device to carry out a method according to an embodiment of the invention as a scheduler of a communication network when being executed by a processor of the computing device. The scheduler allows the communication network to reliably support a distributed real-time application requiring low latency and low jitter connection.

It is an advantage of the invention that it reliably provides a distributed real-time application with a low latency and low jitter connection. Apart from that, it can be implemented independent of a GBR feature of the connection.

It shall be understood that the features described previously and to be described subsequently may be used not only in the indicated combinations but also in different combinations or on their own without departing from the scope of the present invention.

The invention is described in detail via an exemplary embodiment and with reference to the drawings. Like components are indicated by like reference numerals throughout the drawings.

FIG. 1 schematically shows an entity diagram of a communication network 1 being operated in a method according to an embodiment of the invention. The communication network 1 comprises a scheduler 10 according to an embodiment of the invention.

The scheduler 10 is appropriate for the communication network 1 and configured for carrying out a method according to an embodiment of the invention cooperating with a distributed real-time application 2 according to the invention (see below). The scheduler 10 may be implemented via a computer program product. The computer program product comprises a digital storage medium storing a program code.

The program code causes a computing device to carry out an exemplary embodiment of a method according to the invention as the scheduler 10 of the communication network 1 in cooperation with the distributed real-time application 2 when being executed by a processor of the computing device.

The communication network 1 may further comprise an edge cloud server 11 and a backbone 12. The communication network 1 may be connected to an internet 5. The communication network 1 is configured for providing a terminal device 4 with a communication connection 3. For instance, a Radio Access Network (RAN) as the communication network 1 provides a wireless connection as the connection 3.

The terminal device 4 and the edge cloud server 11 may be configured for executing the distributed real-time application 2. The distributed real-time application 2 comprises a sender 20 and a receiver 21 and is configured for carrying out the following method cooperating with the scheduler 10 of the communication network 1.

By way of example, a mobile device as the terminal device 4 executes an application frontend of the distributed real-time application 2 as one of the sender 20 of the distributed real-time application 2 and the receiver 21 of the distributed real-time application 2. The edge cloud server 11 may execute an application backend of the distributed real-time application 2 as the other one of the sender 20 and the receiver 21.

According to an embodiment of the invention, the communication network 1 is operated as follows.

The terminal device 4 and the edge cloud server 11 may execute the sender 20 and the receiver 21 of the distributed real-time application 2, respectively, or vice versa.

The sender 20 of the distributed real-time application 2 transmits a data stream 22 at a data rate to a receiver 21 of the distributed real-time application 2 via a connection 3 provided by a communication network 1. Particularly, a 5G cellular network provides the wireless connection and the data stream 22 is transmitted as a 5G flow. The connection 3 may be provided as a Non-GBR bearer of the communication network 1.

The scheduler 10 of the communication network 1 allocates spectral resources of the communication network 1 for the data stream 22 according to a high rank priority assigned to the data stream 22 by the communication network 1. The spectral resources may be allocated dependent on the data rate, a signal quality of the connection 3 and/or a load of the communication network 1. The priority is exemplarily assigned as an absolute priority, a delay-based priority, or a relative priority.

The scheduler 10 marks packets 220 of the data stream 22 dependent on a difference of the allocated spectral resources from spectral resources allowed for the data stream 22. Marking a packet 220 may comprise setting an ECN bit of an IP header of the packet 220.

The scheduler 10 preferably marks a percentage of the packets 220, the percentage being a value of a function of the difference. A step function defining a threshold value, a linear function, or a non-linear function may be evaluated as the function.

The allowed spectral resources are exemplarily determined according to a fair distribution of spectral resources among a plurality of distributed applications or equal to spectral resources predetermined for the distributed real-time application 2.

The receiver 21 of the distributed real-time application 2 checks the data stream 22 for marked packets 220 and causes the sender 20 to gradually reduce the data rate of the data stream 22 as long as the data stream 22 comprises marked packets 220. Gradually reducing may comprise smoothly reducing during a grace time, the grace time being in a range from some 100 milliseconds to few seconds.

When the allocated spectral resources exceed the allowed spectral resources after the grace time, the rank of the priority may be lowered and the allocated spectral resources may be reduced correspondingly. Alternatively an L4S method may be applied to the data stream 22.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

1 communication network
10 scheduler
11 edge cloud server
12 backbone
2 distributed real-time application
20 sender
21 receiver
22 data stream
220 packet
3 connection
4 terminal device
5 internet

The invention claimed is:

1. A method for operating a communication network, comprising:

transmitting, by a sender of a distributed real-time application, a data stream at a data rate to a receiver of the distributed real-time application via a connection provided by the communication network;

allocating, by a scheduler of the communication network, spectral resources of the communication network for the data stream according to a priority assigned to the data stream by the communication network;

marking, by the scheduler, packets of the data stream based on a difference between the allocated spectral resources and spectral resources allowed for the data stream; and checking, by the receiver of the distributed real-time application, the data stream for marked packets and causing the sender to gradually reduce the data rate of the data stream based on determining that the data stream comprises marked packets.

2. The method according to claim 1, wherein the scheduler marks a percentage of the packets.

3. The method according to claim 2, wherein marking the percentage of the packets is based on a step function defining a threshold value, a linear function, or a non-linear function.

4. The method according to claim 1, wherein marking a respective packet comprises setting an Explicit Congestion Notification (ECN) bit of an Internet Protocol (IP) header of the respective packet.

5. The method according to claim 1, wherein gradually reducing the data rate comprises smoothly reducing the data rate during a grace time, the grace time being in a range from 100 milliseconds to 4 seconds.

6. The method according to claim 5, wherein a rank of the priority is lowered and the allocated spectral resources are correspondingly reduced based on the allocated spectral resources exceeding the allowed spectral resources after the grace time.

7. The method according to claim 5, wherein a Low Latency, Low Loss and Scalable throughput (L4S) method is applied to the data stream based on the allocated spectral resources exceeding the allowed spectral resources after the grace time.

8. The method according to claim 1, wherein the spectral resources are allocated based on the data rate, a signal quality of the connection, and/or a load of the communication network.

9. The method according to claim 1, wherein the priority is assigned as an absolute priority, a delay-based priority, or a relative priority.

10. The method according to claim 1, wherein a terminal device and an edge cloud server execute the sender and the receiver, respectively, or vice versa.

11. The method according to claim 1, wherein the communication network comprises a Radio Access Network (RAN), and the connection comprises a wireless connection.

12. The method according to claim 11, wherein a 5G cellular network provides the wireless connection and the data stream is transmitted as a 5G flow.

13. The method according to claim 11, wherein the connection is provided as a Non-Guaranteed Bit Rate (Non-GBR) bearer of the communication network.

14. The method according to claim 1, wherein the allowed spectral resources are determined according to a fair distribution of spectral resources among a plurality of distributed applications or are equal to spectral resources predetermined for the distributed real-time application.

15. A system, comprising:

a receiver of a distributed real-time application;

a sender of the distributed real-time application, wherein the sender is configured to transmit a data stream at a data rate to the receiver of the distributed real-time application via a connection provided by a communication network; and a scheduler of the communication network, wherein the scheduler is configured to:

allocate spectral resources of the communication network for the data stream according to a priority assigned to the data stream by the communication network; and mark packets of the data stream based on a difference between the allocated spectral resources and spectral resources allowed for the data stream;

wherein the receiver of the distributed real-time application is configured to check the data stream for marked packets and cause the sender to gradually reduce the data rate of the data stream based on determining that the data stream comprises marked packets.

16. One or more non-transitory computer-readable mediums having processor-executable instructions stored thereon for operating a communication network, the processor-executable instructions, when executed, facilitating performance of the following:

transmitting, by a sender of a distributed real-time application, a data stream at a data rate to a receiver of the distributed real-time application via a connection provided by the communication network;

allocating, by a scheduler of the communication network, spectral resources of the communication network for the data stream according to a priority assigned to the data stream by the communication network;

marking, by the scheduler, packets of the data stream based on a difference between the allocated spectral resources and spectral resources allowed for the data stream; and checking, by the receiver of the distributed real-time application, the data stream for marked packets and causing the sender to gradually reduce the data rate of the data stream based on determining that the data stream comprises marked packets.

* * * * *